United States Patent Office 3,495,503
Patented Feb. 17, 1970

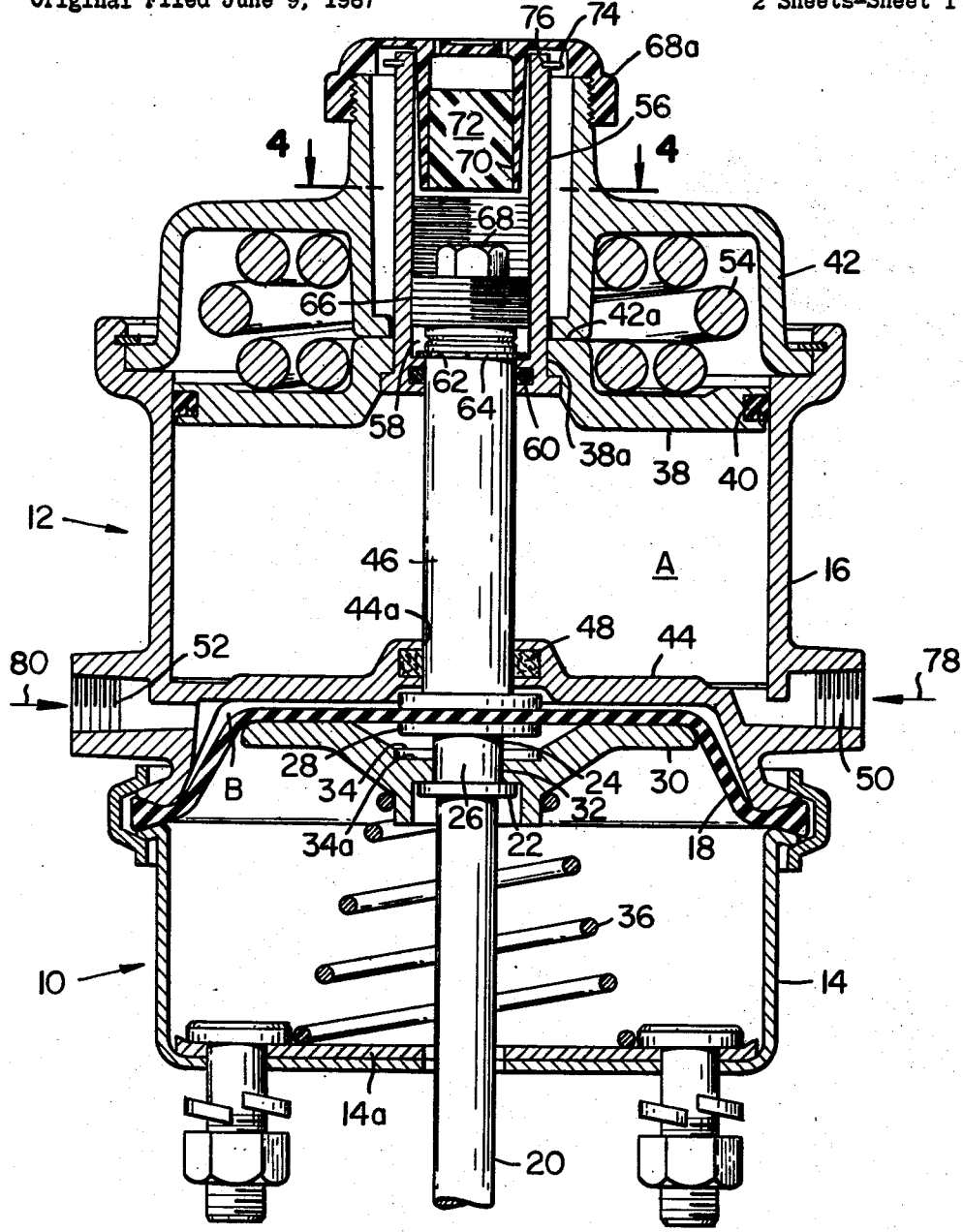
FIG_1

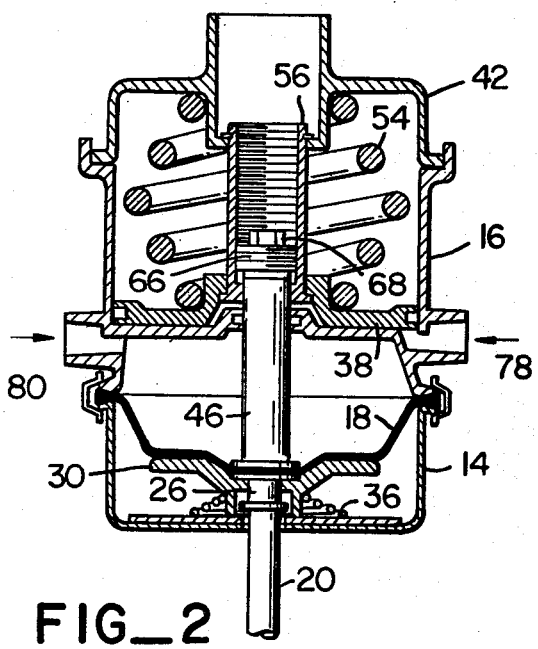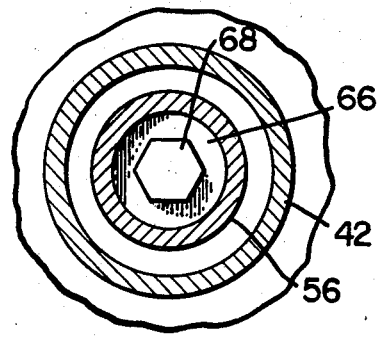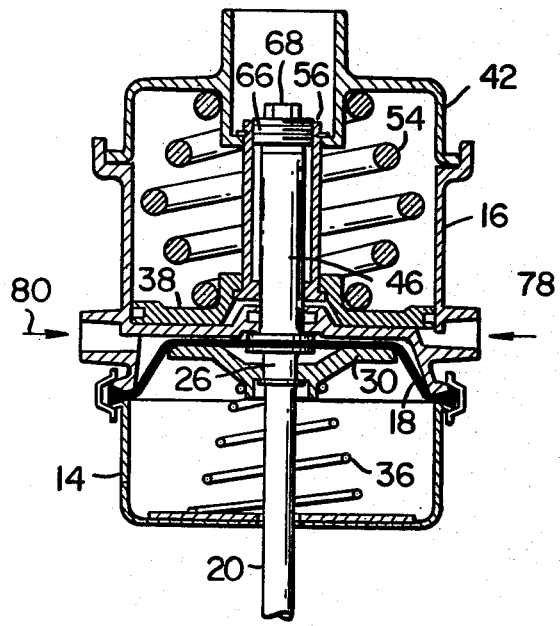

3,495,503
BRAKE-RELEASE MECHANISM
Allen L. Gummer and George P. Mathews, Cloverdale, Calif., assignors to MGM Brakes, Inc., Cloverdale, Calif., a corporation of California
Continuation of application Ser. No. 645,013, June 9, 1967, This application Apr. 9, 1969, Ser. No. 816,169
Int. Cl. F01b 7/20, 21/02, 3/10
U.S. Cl. 92—63        1 Claim

ABSTRACT OF THE DISCLOSURE

A brake-release mechanism which is adapted to work in cooperation with an auxiliary brake-operating mechanism which includes a movable wall, a sleeve adapted to move therewith and a plug threadedly connected to the internal surface of a sleeve and accessible from without the sleeve, the plug being adapted under movement of the wall to act on and move a push rod to apply the brakes, the release of the brakes being effected by inserting a wrench into the sleeve and turning the plug in a releasing direction.

This application is a continuation of application 645,013, filed June 9, 1967, and now abandoned.

BACKGROUND OF THE INVENTION

This invention relates to vehicle-braking apparatus and, more particularly, to an apparatus for effectuating a release of conventional braking systems.

Modern-day trucks and other heavy-duty vehicles are normally equipped with pneumatic braking systems which operate off a main pressure source. Inasmuch as a failure in the main pressure source inhibits the normal operation of those braking systems, it is now conventional that an auxiliary brake-operating means be provided which will automatically apply the service brakes in event of a loss of pressure.

Furthermore, since in certain instances it may be impossible to repair the cause of the loss of air pressure at the point of failure, it was deemed necessary to provide additional means to release the service brakes so as to permit the vehicle to be towed. A braking system of this kind is shown and described in United States Patent No. 3,107,583.

A further development of this type of device is the subject of United States patent application Ser. No. 597,940 filed Nov. 30, 1966, now Patent No. 3,424,062, which incorporates the auxiliary brake-operating means of United States Patent No. 3,107,583. This device provides an emergency brake-actuating stroke which is greater than the normal service brake-actuating stroke.

It is to be noted that, because of the confined area in which these brake mechanisms are used (i.e., adjacent each wheel of a vehicle where there are axles, brake lines, and the like), a difference of ¾ of an inch or 1 inch in overall brake mechanism dimensions is extremely critical and can mean the difference between use of a certain mechanism being possible or impossible. However, it is not enough to merely reduce the dimensions of a given brake mechanism to make it proportionally smaller, since this would have the effect of lowering the capacity of the device. What is desired is the reduction in the dimensions of a given brake mechanism while the full braking capacity of that mechanism is retained.

The object of this invention, therefore, is to improve upon the device which is the subject of United States patent application Ser. No. 597,940, filed Nov. 30, 1966, by providing a mechanism which, while having braking capacity equal thereto, is of smaller overall dimensions.

SUMMARY OF THE INVENTION

Broadly stated, the brake-actuating mechanism comprises a first expansible chamber device including a housing having a first movable wall. A brake-actuating rod is operably associated with the first movable wall and adapted to be moved thereby in a braking direction. Means are included for transmitting fluid pressure into the first expansible chamber device moving the first movable wall in a braking direction. Means are included for resiliently opposing movement of the rod in a braking direction and biasing the rod into a brake-releasing position. Further included is auxiliary brake-operating means comprising a second expansible chamber device including a housing and a second movable wall. Also included is a sleeve extending from and adapted to move with the second movable wall. A push rod is adjustably mounted to the sleeve for transmitting braking movement to the brake-actuating rod, and means held within the sleeve and accessible from without the second expansible chamber device are included for axially adjusting the push rod relative to the sleeve. Also included are means resiliently urging the second movable wall in a braking direction and means for transmitting fluid pressure into the second expansible chamber device and moving the second movable wall in a brake-releasing direction.

Various objects of this invention will become apparent in view of the drawings and the following detailed description.

BRIEF DESCRIPTION OF THE DRAWINGS

In the drawings forming a part of this application, and in which like parts are identified by like reference numerals throughout the same, FIG. 1 is a longitudinal center section of a preferred embodiment of braking apparatus according to the teaching of the invention;

FIG. 2 is a simplified longitudinal center section of the apparatus shown in FIG. 1, but illustrating the position of the parts when the auxiliary brake-operating means are used;

FIG. 3 is a simplified longitudinal center section of the apparatus of FIGS. 1 and 2, but illustrating the positions of the parts when the brake-actuating push rod is moved to a brake-releasing condition;

FIG. 4 is a sectional view taken along the line 4—4 of FIG. 1.

DESCRIPTION OF THE PREFERRED EMBODIMENT

FIG. 1 shows a pneumatic braking actuator 10 and an auxiliary braking device 12, the respective bodies 14 and 16 of which sealingly hold a diaphragm 18 therebetween. A brake-actuating rod 20 is juxtaposed within the actuator body 14, and is urged by means such as a brake shoe return spring, not shown, in a brake-releasing direction and biased into a brake-releasing position. The brake-actuating rod 20 has a radial flange 22 formed thereon.

A nut 24 is threadedly secured to the brake-actuating rod 20, the nut 24 having a body 26 and a radial rib 28 formed thereon which is positioned so that when the nut 24 is fully tightened down on the brake-actuating rod 20, the nut body 26 is in contact with a portion of the radial flange 22 and a gap exists between the radial flange 22 and the radial rib 28.

A substantially disclike piston 30 is disposed about the nut body 26, the nut body 26 passing through a central aperture 32 in the piston 30. The nut body 26 is slidably in the aperture 32 within the piston 30 and is limited in movement in one direction by the radial flange 22 contacting the piston 30 and in the other direction by the radial rib 28 contacting the piston 30.

The piston 30 has a recess 34 which includes a seat 34a about the aperture 32 located where the piston 30 is contacted by the radial rib 28. Thus the radial rib 28 is seatable in the seat 34a. That portion of the upper surface of the piston 30 between its outer periphery and the recess 34, and the upper surface of radial rib 28 of nut 24, are positioned to contact the diaphragm 18 and be urged thereby in a braking direction. However, the piston 30 has a much larger area in contact with the diaphragm 18 than does the upper surface of the radial rib 28 of nut 24.

A helical spring 36 is disposed between the piston 30 and the actuator body 14, the spring 36 urging against that surface of the piston 30 opposite the surface which bears against the diaphragm 18. The parts are thus arranged so that air pressure against the diaphragm 18 will urge the piston 30, which in turn urges the radial flange 22 of the brake-actuating rod 20 in a brake-operating direction. The helical spring 36 opposes movement of the piston 30 and diaphragm 18 in a braking direction and biases the piston 30 and diaphragm 18 in a brake-releasing position. The travel of the piston 30 in a braking direction is limited by the piston 30 contacting either the end wall of the actuator body 14 or an end wall reinforcing plate 14a.

The auxiliary brake-operating device 12 defines an expansible chamber A comprising a body 16 within which is a movable wall 38. The wall 38 has a peripheral sealing element 40 which engages the inner surface of the body 16. Body 16 has attached a cover plate 42 and includes an opposite end wall 44 which forms an expansible chamber B with the diaphragm 18. The end wall 44 is a barrier between the chambers A and B and defines an opening 44a that receives a push rod 46. Actuator body 14 and end wall 44 thus form a first housing, and body 16, end wall 44, and cover plate 42 thus form a second housing. A sealing means 48 is disposed intermediate push rod 46 and the opening 44a for pressure-sealing each chamber. Threaded conduit means 50 and 52 are provided for transmitting fluid pressure into the chambers A and B respectively. It will be noted that a compression spring 54 is disposed between wall 38 and cover plate 42 for urging wall 38 in a brake-applying direction. A central sleeve 56 having an inner recess 58 for receiving the push rod 46 is sealingly secured within an aperture 38a in the wall 38. A sealing means 60 disposed within the sleeve portion 56 receives the push rod 46 in a sliding fit allowing reciprocal movement of the push rod 46 relative to the wall 38. It will be noted that push rod 46 is formed with a groove 62 having a retaining clip 64 for limiting the relative free slidably movement of the rod 46 in the direction of the diaphragm 18. The sleeve 56 is internally threaded along its length and is thus adapted to threadedly receive therein a cylindrical plug 66. The cylindrical plug 66 has formed on one end a hexagonal head 68. A removable breather cap 68a is fitted to the cover plate 42 over the end of the sleeve 56 and has a substantially cylindrical portion 70 which extends into the sleeve 56. The substantially cylindrical portion 70 holds therein a plastic foam filter 72 the operation of which will be later described. A retaining clip 74 is fitted in a groove 76 about the outer periphery of the sleeve 56.

It will be seen that the sleeve 56 is adapted to be moved with the wall 38 under the pressure of spring 54, and that the plug 66, carried by sleeve 56, will urge the push rod 46 into contact with the diaphragm 18.

In operation, threaded conduit means 50 and 52 are connected to a primary pressure source 78 and a valve-controlled pressure line 80. Under normal conditions, i.e., without braking of the vehicle, the parts will be arranged as in FIG. 1. Pressure in chamber A will move the wall 38 against the force of the spring 56 until the wall 38 contacts the stop surface 42a. Since relatively little or no pressure is passed into chamber B, the spring 36, and the means which urge the brake-actuating rod 20 in a brake-releasing direction, moves the piston 30, diaphragm 18, and brake-actuating rod 20 to a brake-releasing position, with the radial flange 22 against the piston 30.

It will also be apparent that the brakes may be actuated by applying pressure through line 80 into chamber B. The pressure will move the diaphragm 18 against the piston 30, and the surface portion of the piston 30 bearing on the radial flange 22 in turn moves the brake-actuating rod 20, thereby applying the brakes. When the brakes are released, the parts will return to the positions shown in FIG. 1, as explained above.

FIG. 2 shows the auxiliary brake-operating device 12 in operation. Piston 30 is bottomed out against reinforcing plate 14a. The pressure holding the wall 38 against the spring 54 has been released and the wall 38 has been moved thereby in a brake-actuating direction. The plug 66, moving along with the wall 38, has urged the push rod 46 against the diaphragm 18 to apply the full force of the spring 54 against the nut 24, thereby moving the brake-actuating rod 20 into recess 34 so the radial rib 28 seats on seat 34a. Thus rod 20 moves further than piston 30 under normal brake application.

It is to be noted that, as the piston 38 moves under the force of the spring 54, air will be drawn into the area vacated by the sleeve 56 and plug 66. The foam filter 72 serves to filter the air entering that area, and thus to keep dirt and contaminants from the threaded portion of the sleeve 56.

Assuming that it is now desired to release the brakes, this may be done by removing the cap 68a to make the plug 66 accessible from outside the device. A long socket wrench may be inserted down into the sleeve and turned by means of hexagonal head 68. This allows spring 36 and the brake shoe return spring to move push rod 46 through piston 30, thereby effecting a release of the service brake. The position of parts, when fully released, would be substantially as shown in FIG. 3.

It is to be noted that the device disclosed herein is of smaller dimensions than the device disclosed in United States patent application Ser. No. 597,940, filed Nov. 30, 1966, because the means for axially adjusting the push rod 46 relative to the sleeve 56 (i.e., the plug 66) is fully contained within the sleeve. This, of course, results in adaptability for use in places where previous known devices could not be fitted.

What is claimed is:
1. In combination, a brake-actuating mechanism comprising: a first expansible chamber device including a housing having a first movable wall, a brake-actuating rod operably associated with said first movable wall and adapted to be moved thereby in a braking direction, means for transmitting fluid pressure into said first expansible chamber device moving said first movable wall in a braking direction, means resiliently opposing movement of said rod in a braking direction and biasing said rod into a brake-releasing position; auxiliary brake-operating means comprising a second expansible chamber device including a housing and a second movable wall, a sleeve adapted to move with said second movable wall, the end of said sleeve remote from said second movable wall being constrained to movement between a first extreme position wholly within the confines of said housing and a second extreme position substantially flush with the confines of said housing, said sleeve being internally threaded along its entire length which terminates adjacent said second movable wall, means including a push rod having one end adjustably mounted within said sleeve for transmitting brake movement to said brake-actuating rod through the other end thereof extending beyond the sleeve in the direction of said brake actuating rod, adjustment means having a substantially lesser axial length than said sleeve and mounted for coaxial movement relative thereto in directions toward and away from said brake actuating rod between extreme adjustment positions substantially wholly telescoped within said sleeve, said adjustment means for axially adjusting said push rod relative to said sleeve com- prises a cylindrical plug threadedly connected to the internal surface of the sleeve, said adjustment means having at least one position wherein said adjustment means is wholly telescoped within said sleeve and adjacent said second movable wall, said adjustment means being engageable with said one end of said push rod for limiting the travel thereof relative to said sleeve in a brake releasing direction, an opening in said housing providing access to said adjustment means from without said second expansible chamber device for axially adjusting said push rod relative to said sleeve within the confines of said housing, means resiliently urging said second movable wall in a braking direction, and means for transmitting fluid pressure into said second expansible chamber device and moving said second movable wall in a brake-releasing direction.

References Cited

UNITED STATES PATENTS

| | | | |
|---|---|---|---|
| 1,652,879 | 12/1927 | Standerwick | 92—129 |
| 2,467,517 | 4/1949 | Almond | 92—129 X |
| 3,107,583 | 10/1963 | Woodward | 92—63 |
| 3,152,524 | 10/1964 | Newell | 92—114 X |
| 3,218,939 | 11/1965 | Cruse | 92—63 |
| 3,372,623 | 3/1968 | Wearden et al. | 92—63 |

MARTIN P. SCHWADRON, Primary Examiner

IRWIN C. COHEN, Assistant Examiner

U.S. Cl. X.R.

92—64, 114